Dec. 30, 1952 P. SENARD 2,623,414
AUTOMATIC SAW BLADE PLANISHING, STRETCHING, AND
STRAIGHTENING MACHINE
Filed July 17, 1951 9 Sheets-Sheet 1

INVENTOR
PIERRE SENARD
BY *Robert E Burns*
ATTORNEY

Dec. 30, 1952 P. SENARD 2,623,414
AUTOMATIC SAW BLADE PLANISHING, STRETCHING, AND
STRAIGHTENING MACHINE
Filed July 17, 1951 9 Sheets-Sheet 2

INVENTOR
PIERRE SENARD
BY Robert E. Burns
ATTORNEY

INVENTOR
PIERRE SENARD
BY Robert E Burns
ATTORNEY

Dec. 30, 1952 P. SENARD 2,623,414
AUTOMATIC SAW BLADE PLANISHING, STRETCHING, AND
STRAIGHTENING MACHINE
Filed July 17, 1951 9 Sheets-Sheet 9

INVENTOR
PIERRE SENARD
BY Robert E. Burns
ATTORNEY

Patented Dec. 30, 1952

2,623,414

UNITED STATES PATENT OFFICE 2,623,414

AUTOMATIC SAW BLADE PLANISHING, STRETCHING, AND STRAIGHTENING MACHINE

Pierre Senard, Bapeaume-les-Rouen, France

Application July 17, 1951, Serial No. 237,105
In France July 20, 1950

12 Claims. (Cl. 76—27)

This invention relates to a novel machine specially designed for planishing, stretching and straightening band saw blades in a fully automatic and mechanical manner.

It is known that after an extensive use or in case of faulty operation of the sawing machine on which it is mounted, a saw blade becomes defective and requires, apart from the usual saw-sharpening operation, a three-step reconditioning comprising planishing, tensioning and straightening operations.

The first or planishing operation consists in flattening out the swells formed on either side of the blades as may be observed by placing the blade flat on a flat surface. This planishing step is carried out by hammering or rolling these swells. After this step the blade has a smooth appearance when laid flat, yet it has irregularities of tension resulting in further swells occurring in the unstressed portions of the blade when the latter is bent to a sufficient curvature. All these swells having their convexities directed in the sense of curvature of the blade. These irregularities are subsequently removed by means of another rolling operation applied to those blade portions which offer no swells when the blade is bent, whereby these portions are strained or stretched like those from which the previous swells have been removed during the first step. Finally, it may be that the back edge of the blade is not rectilinear when laid flat. This inconvenience disappears when rolling operations are carried out on the one hand on the saw blade portion adjacent to the back edge but only in those places where this back edge is concave and, on the other hand, on the saw blade portion adjacent to the toothed edge but only in those places where the back edge is convex.

Automatic machines are already known in which the places to be rolled are detected by feelers and recorded mechanically on a diagram read by photoelectric cells adapted to control the operation of pressing rollers between which the saw blade is so fed that pairs of cooperating rollers are moved towards each other in order to apply a clamping stress whenever a swell arises.

Machines for stretching previously planished saw blades are also known which operate according to the same principle with feelers exerting a control action on a moving portion of the saw blade having a sufficiently reduced radius of curvature to cause the swells to emerge distinctly from the blade surface. Besides, in the present state of the art no machine is known for mechanically and automatically straightening saw blades.

One object of this invention is to provide a saw blade planishing machine wherein the electrical connection between the feelers and the pressing rolls is such that any intermediate recording diagram can be dispensed with.

It is another object of this invention to provide a machine of the type specified above but designed to carry out automatically on the same saw blade and at the same time a combined planishing- and stretching operation.

Finally, a further object of the present invention is to provide a machine as broadly defined in the preceding paragraph but adapted simultaneously to perform a planishing, a stretching and also a straightening operation on the same saw blade.

For this purpose, the blade is continuously moved in a longitudinal direction as an endless band and passed in front of two series of feelers of which the one is positioned in front of a rectilinear portion and the other in front of a curvilinear portion of the blade, each feeler being adapted to control the actuation of a couple of pressing rollers between which the blade is passed, this control action taking place through the intermediary of a contact member, an electronic tube, a thyratron relay, an electromagnet valve and a hydraulic ram, whilst a pair of photoelectric cells are provided in view of detecting light rays which are intercepted for one cell when the band is convex and pass freely for the other cell when the blade is concave, these cells being adapted to control the operation either of a pair of pressing rollers adjacent to the back edge of the blade or of a pair of pressing rollers adjacent to the opposite or toothed edge of the blade respectively through an electrical circuit energized by the aforesaid photoelectric cells, electronic tube, thyratron relay, electromagnet valve and hydraulic ram.

In the drawings affixed to this specification and forming part thereof one practical embodiment of this invention is illustrated diagrammatically by way of example.

Figure 8:
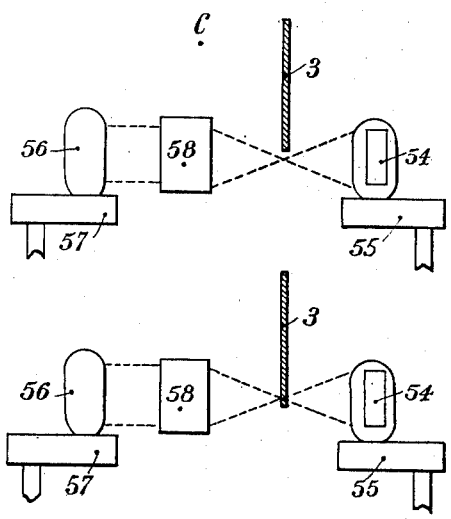

Fig. 8 a diagram illustrating the operation of the straightening detector.

Figure 9:
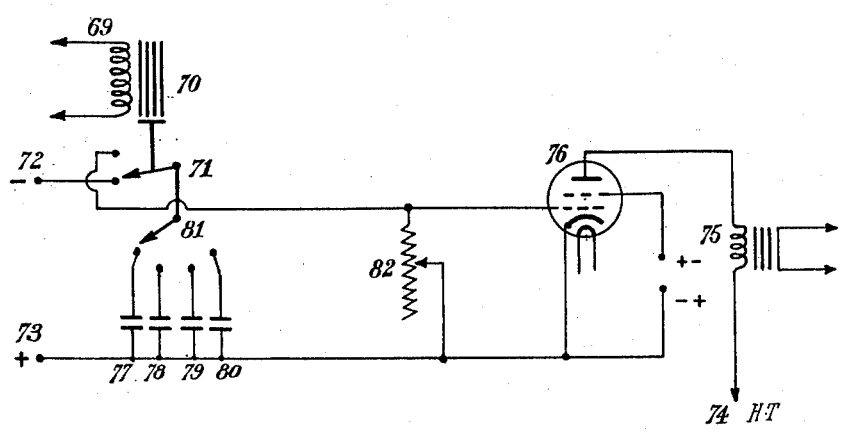

Fig. 9 is a wiring diagram of the time-lag control of the rolling step by the detecting devices.

Figure 5:
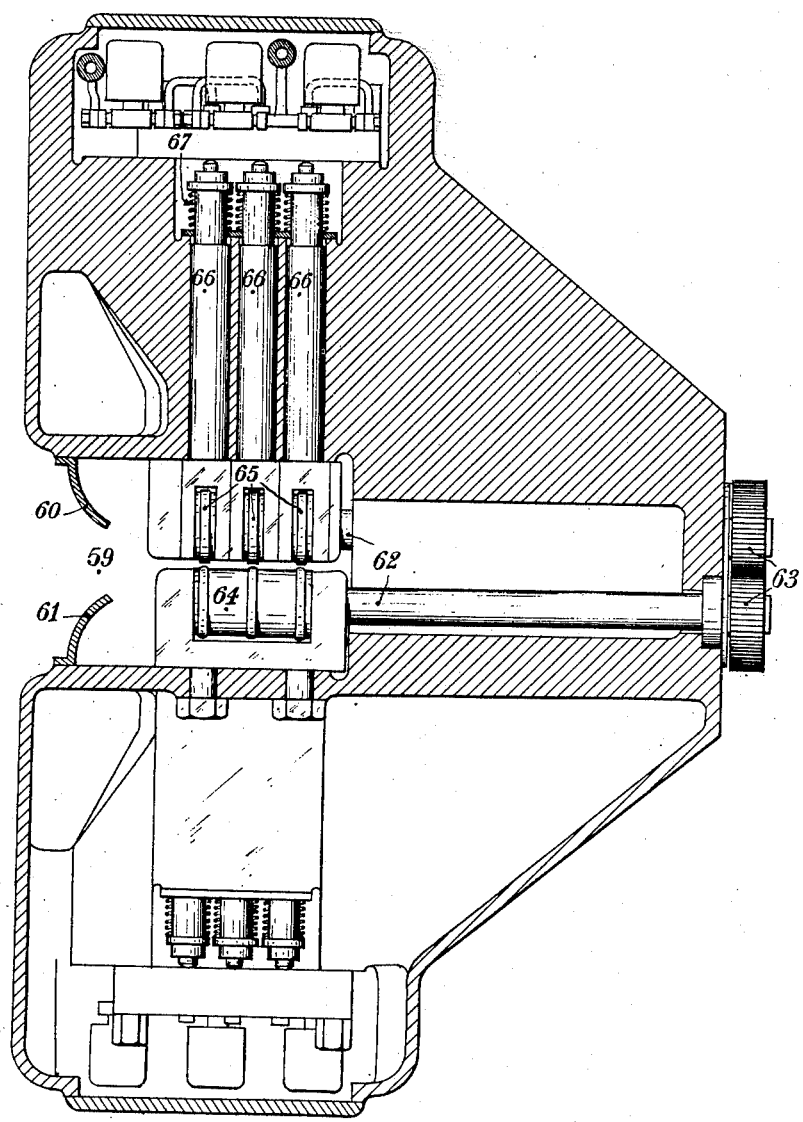
Fig. 5 is a sectional view according to the line V—V of Fig. 1.
Figure 10:
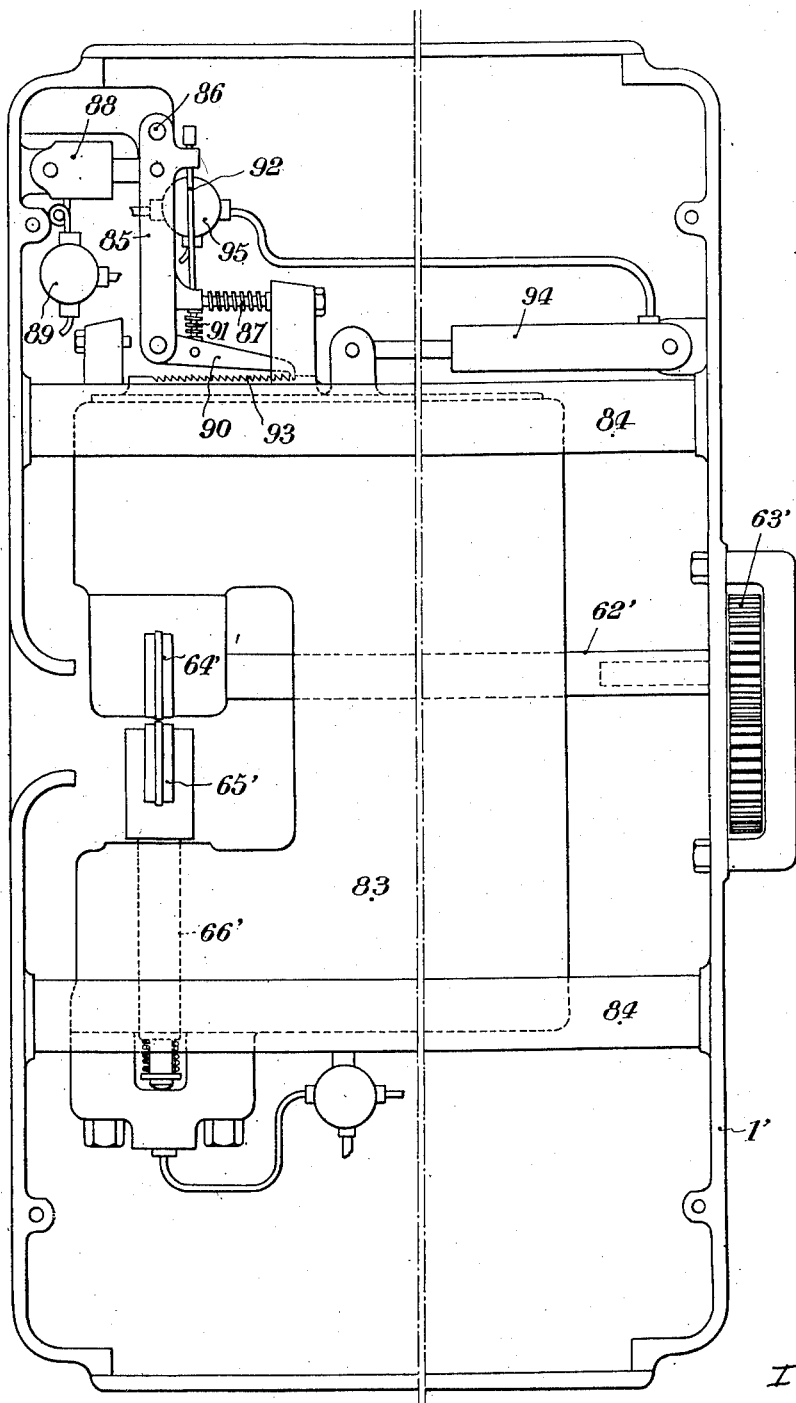

Fig. 10 is a plane view similar to Fig. 5 showing a modified embodiment of the rolling device.

Figure 1:
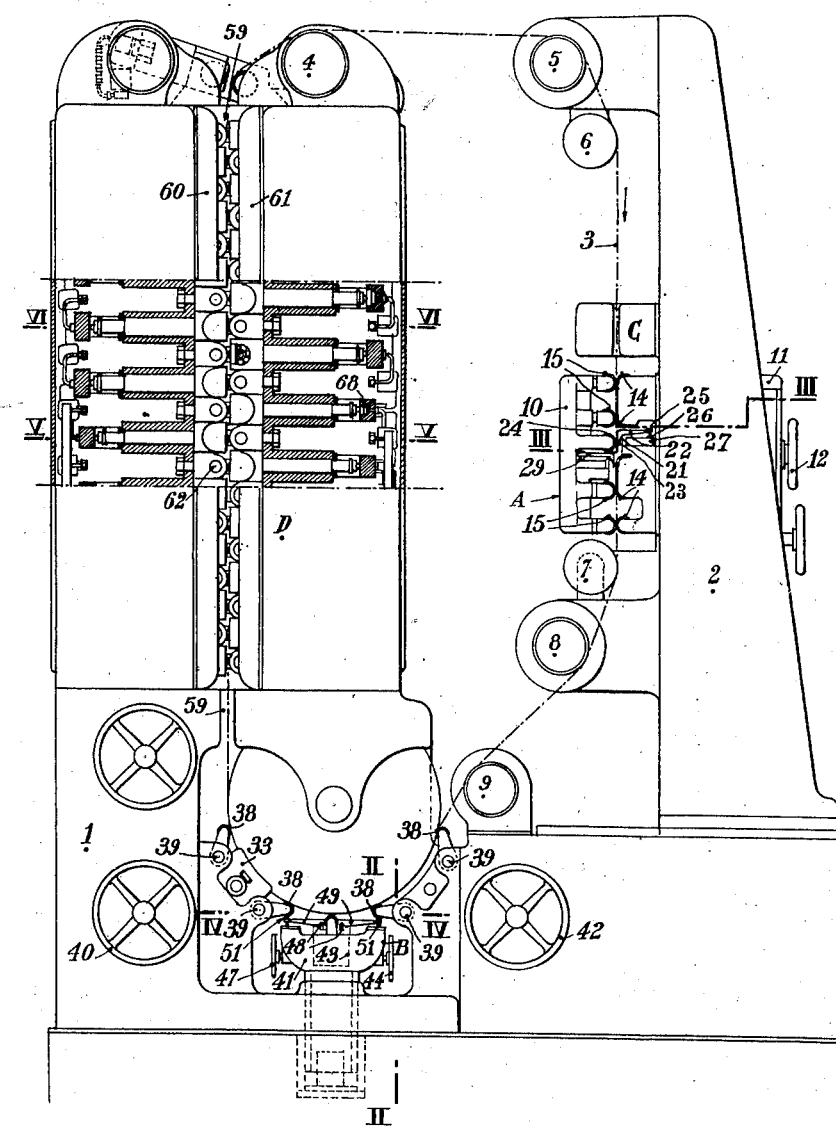
Fig. 1 is a part-sectional elevation of the complete machine.
Figure 2:
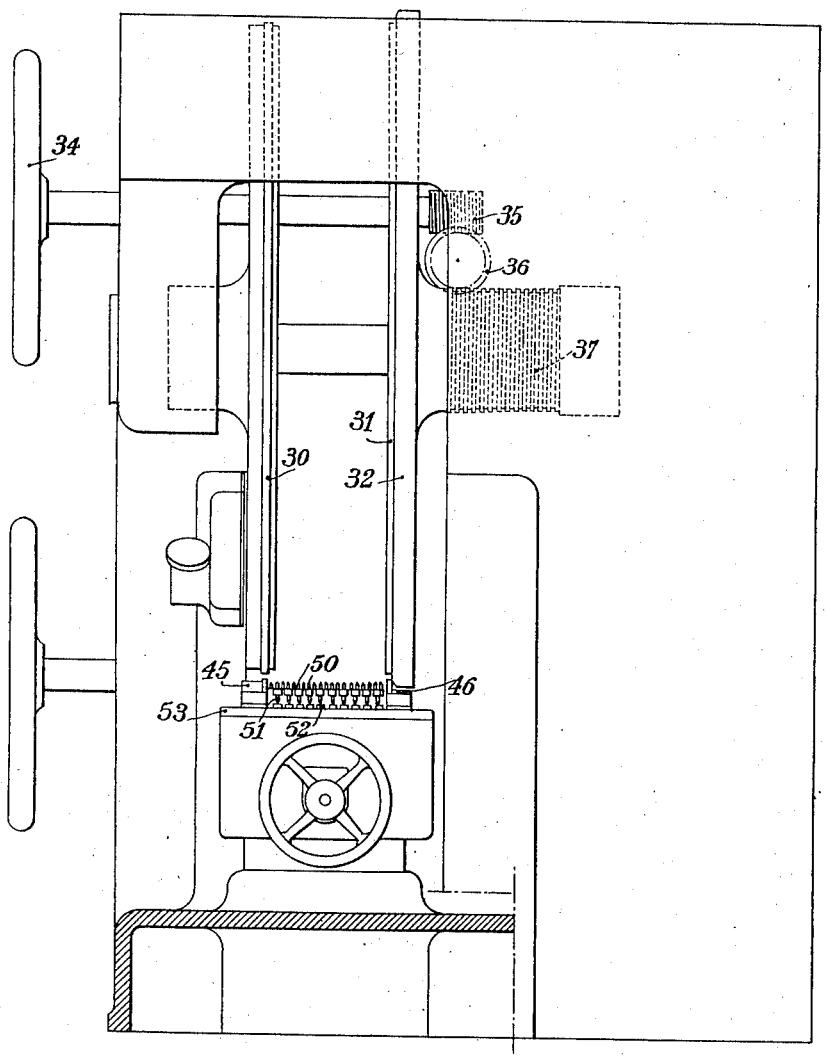
Fig. 2 is a sectional view according to the line II—II of Fig. 1.
Figure 3:
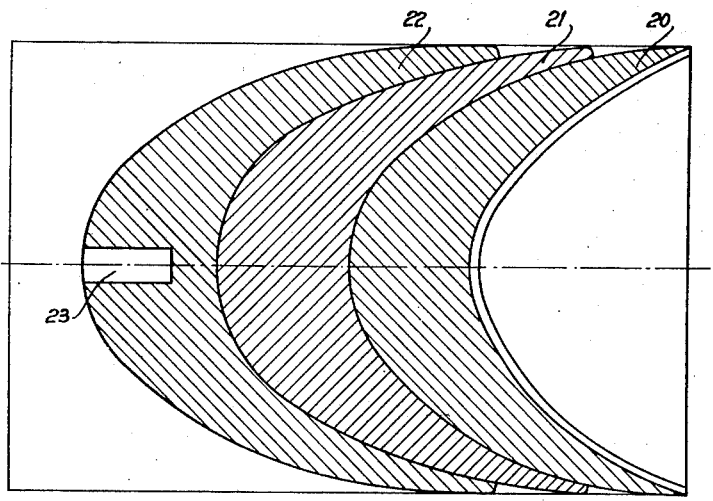
Fig. 3 is a sectional view according to the line III—III of Fig. 1.
Figure 4:
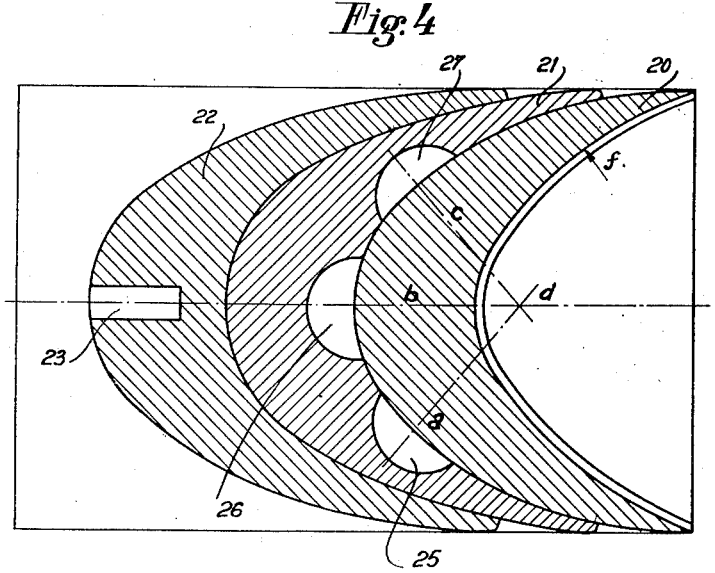
Fig. 4 is a sectional view according to the line IV—IV of Fig. 1.
Figure 11:
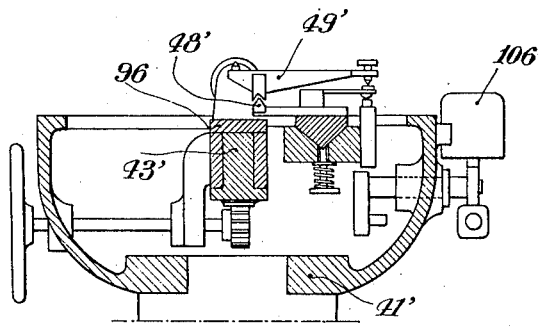
Figure 12:
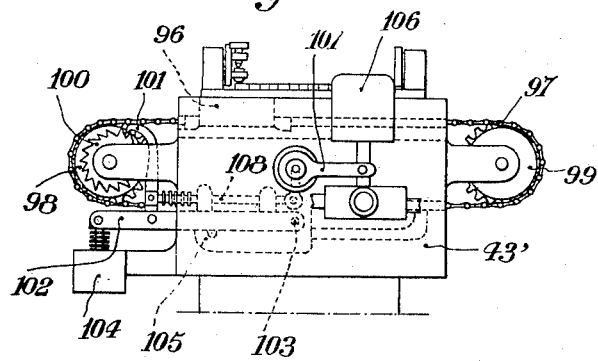
Figure 13:
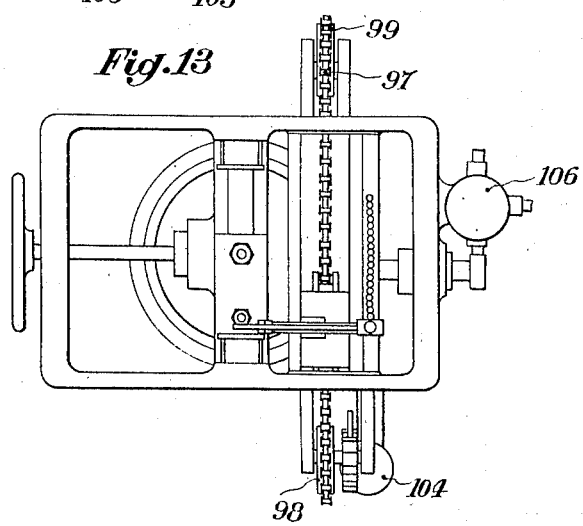

Figs. 11, 12 and 13 are views corresponding to Figs. 1, 2 and 4 respectively, Fig. 11 being a part-sectional view, Fig. 12 a side view and Fig. 13 a plane view, of the arrangement of the feelers in the curved blade portion.

The machine comprises a frame 1 and a support 2 slidably mounted thereon for adapting the machine to different blade lengths. A saw blade 3 to be reconditioned is travelled along a path indicated in chain-dotted lines in Fig. 1, in the direction of the arrow adjacent to the reference numeral 3. The blade is guided along this path by a series of six loose pulleys 4 to 9 and passes successively through a planishing-presetting detector A, a stretching-presetting detector B, a straightening-presetting detector C, and finally a rolling device D controlled by the aforesaid detectors A, B and C.

The planishing pre-setting detector A consists of a movable frame 10 supported for vertical sliding motion by a slideway 11 provided on the support 2. This movable frame 10 can be moved horizontally along a relatively short distance by actuating a handwheel 12 rotatably mounted on this frame and fast with a shaft having a threaded portion 13 engaging a screw-threaded bore formed in a lug integral with the support 2. A set of four pairs of rollers 14 is carried by this support 2 and another set of four pairs of rollers 15 are mounted on the movable frame 10. Each roller 15 is urged by a spring (not shown) against a roller 14 registering therewith and this eight-roller assembly is adapted to guide the saw blade through the detector A. In view of permitting the adjustment of the transverse gap between cooperating rollers according to the thickness of the blade to be reconditioned, the rollers engaging the blade portion adjacent to the back edge thereof which, in the case illustrated in Fig. 1, is the rear portion of the blade shown, are carried by a carrier member 16 the transverse displacement of which in its support 2 is controlled by a handwheel 17 fixed to one end of a shaft having two worm portions 18, 18 meshing with corresponding helical wheels 19, 19 mounted coaxially and fast with a pair of pinions 20, 20 in meshing engagement with a cooperating pair of horizontal rack members fixed to or formed integrally with the aforesaid carrier member 16. The support 2 carries a knife-edge 21 on which a pair of thin levers 22 rest in side-by-side relationship. Each lever 22 carries at one end a friction point 23 adapted to engage the saw blade in the transverse portion thereof where it is guided on its two edges by a pair of rollers 24 rigidly mounted on the movable frame 10. At the opposite end of each lever 22 a set screw 25 is provided for the purpose of engaging a contact member 26 embedded in an insulating plate 27 so as to close an electrical circuit when the friction point 23 is not pushed by a protruding portion of the blade. Therefore, these levers 22 will detect any swells emerging from the right-hand face of the saw blade as seen in Fig. 1. On the other hand, any swells emerging from the left-hand face of the saw blade will be detected, in the blade portion comprised between a corresponding pair of bearing rollers 28 carried by the support 2, by a series of levers 29. By actuating the handwheel 12 adapted to displace the movable frame 10 towards or away from the support 2 it is therefore possible not only to position the blade by inserting it edgewise and clamping it between the rollers 14 and 15 but also to adjust with the greatest accuracy the engagement of the friction points of levers 22 and 29 with the two opposite faces of the blade.

When the saw blade passes through the stretching presetting detector B it is forced along a curved path in order to bring out in sufficient relief the swells of the stretched areas of its surface. For this purpose, the blade bears with its side edges as on a pulley on a pair of circular discs 30, 31 (Fig. 2) mounted for coaxial rotation on frame 1. The disc 31 is formed with a shoulder portion 23 engaged by the back edge of the blade. The opposite or toothed edge of the blade is kept in position by a pair of removable guide members 33 of which the left-hand one only is shown in the drawing, the right-hand guide member being removed for the sake of clearness. The blade-engaging faces of these guide members are suitably lined with a plate of hardened steel. In order to adapt the assembly consisting of the pair of discs 30, 31 to the width of the saw blade to be treated, disc 31 can be moved axially by actuating a handwheel 34 fast with a shaft having a threaded portion 33 meshing with a worm wheel portion of a pinion 36 which in turn is arranged to mesh with a corresponding worm portion 37 of the hub or shaft of disc 31, somewhat in the manner of a pinion-and-rack device. Eight rollers 38 are rotatably mounted by pairs on levers fulcrumed on four pins 39 (Fig. 1), the arrangement being such that the saw blade is applied against the shoulder portions of discs 30, 31 by these rollers 38 which can be pressed against or moved away from the peripheries of these discs by actuating a handwheel 40. A detector frame 41 is adjustable in the vertical direction by means of another handwheel 42 and carries a support 43 the vertical displacement of which can be controlled in turn through another handwheel 44. Above this support 43 the saw blade is held on both shoulder portions of discs 30, 31 by a pair of roller-carrying brackets 45, 46 respectively, of which bracket 46 is adjustable in a transverse direction by means of a handwheel 47. On the aforesaid support 43 there are fixed a pair of knife-edge members 48 having laid thereon in side-by-side relationship a series of thin levers 49, as shown in Fig. 4. Each lever 49 carries at the end thereof which is positioned vertically below the centre of curvature of the saw blade a friction point 50 adapted to engage the blade surface. The opposite or outer end of each lever 49 is provided with a set screw 51 adapted to engage a contact member 52 embedded in an insulating plate 53 so as to close an electrical circuit only during the time in which the friction point 50 is not pushed by a swell emerging from the saw blade surface. These levers 49 will thus detect any unevennesses or swells appearing on the blade face when the blade is bent so as to indicate the overstrained blade portions around which a rolling operation is to be carried out for stretching the blade in view of homogeneously distributing this overstraining in the different blade portions.

The straightening-presetting detector C is adapted to produce a pair of light beams directed at right angles to the surface of the saw blade but closely adjacent to the back edge thereof so that the first light beam will be positioned slightly outside the area covered by the moving saw blade when the latter is perfectly straight, whilst the other light beam will be positioned slightly inside this area.

Under these conditions, whenever the first light beam is cut by the blade as detected by a photoelectric cell disposed on the other side of the blade for receiving this light beam as in conventional photoelectric cell arrangements, an indication will be had as to the positions of the convex portions of the back edge of the blade, whilst any uncovering of the other light beam by the blade as detected by the other photoelectric cell will indicate the concave portions of this saw blade.

As illustrated in Fig. 8, each photoelectric cell 54 is mounted on a supporting member 55 on one side of the back edge of the blade 3 in alignment with a light-source 56 placed on a supporting member 57 on the other side of the blade, an optical device 58 being disposed between each light source and the blade for the purpose of reducing the light beam to its focus or smallest transverse dimension at its intersection with the plane of the blade.

Figure 6:
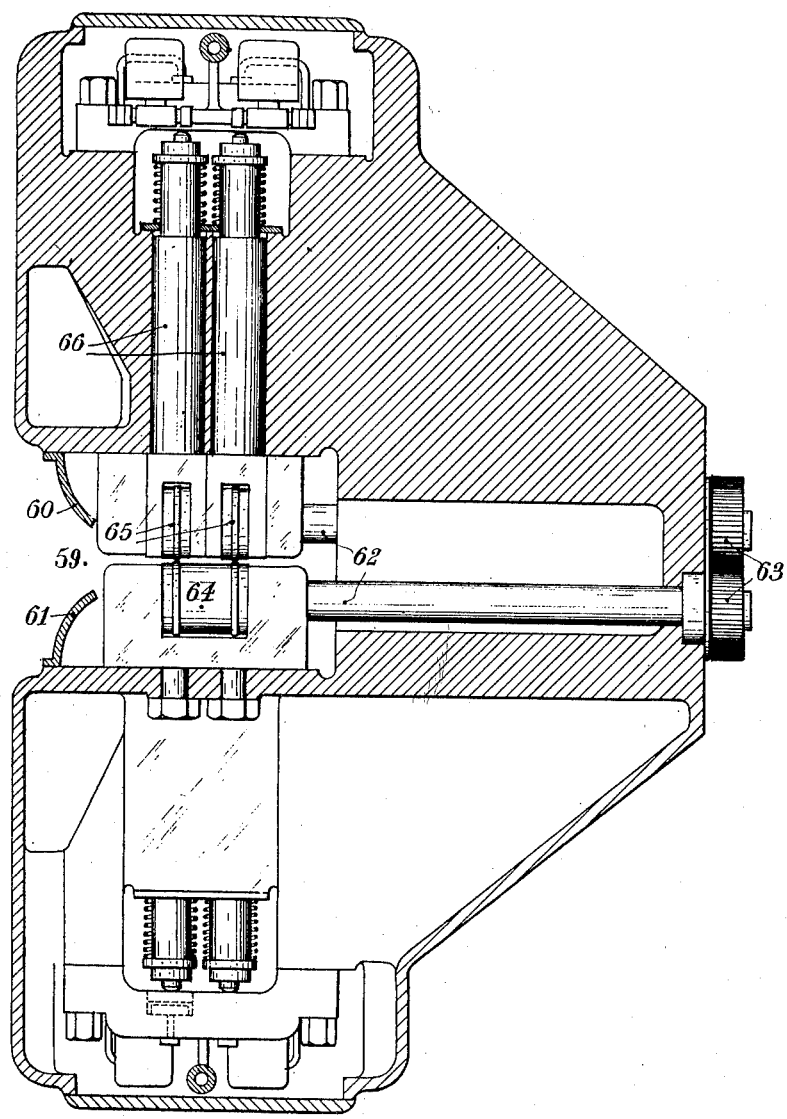
Fig. 6 is a sectional view according to the line VI—VI of Fig. 1.
Figure 7:
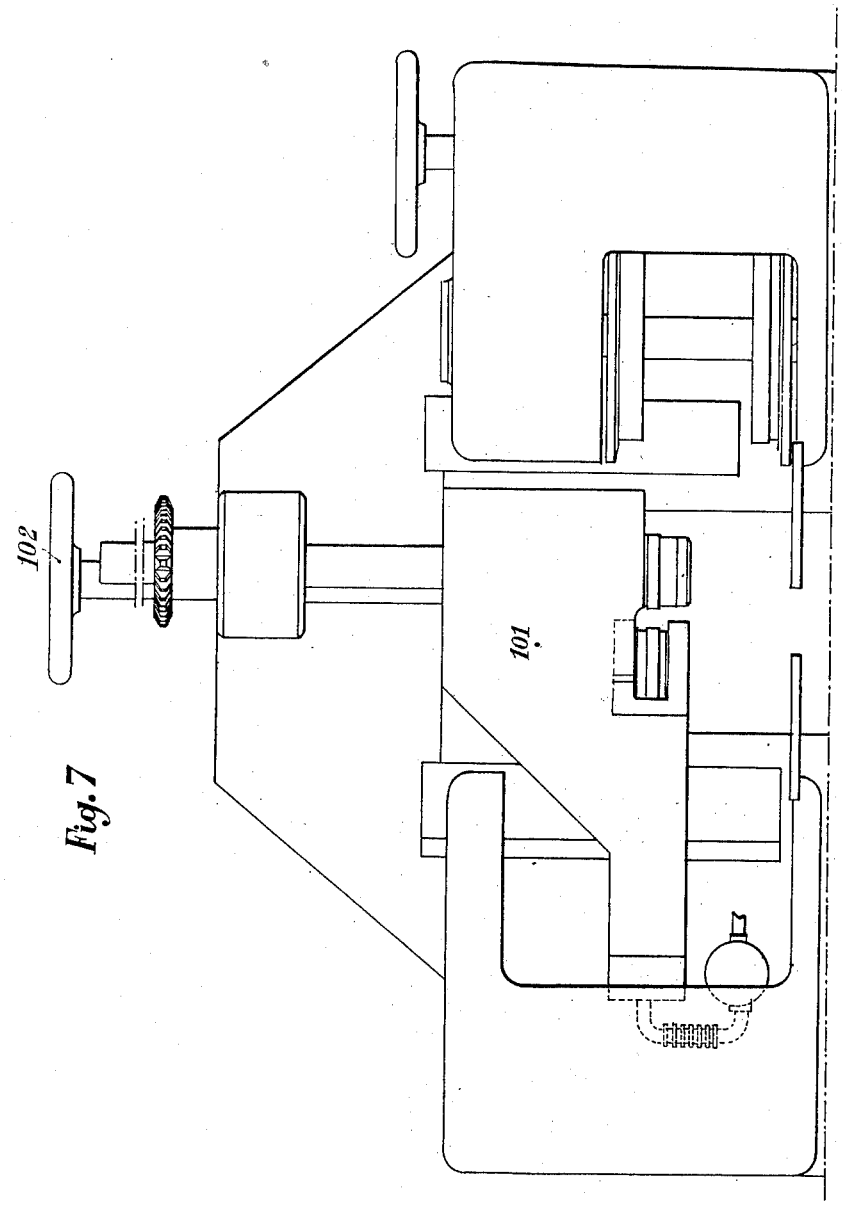
Fig. 7 is a fragmentary plane view.

The pressing or rolling device D is located in a very heavy portion of frame I as illustrated in the horizontal cross-sections thereof in Figs. 5 and 6. This device is formed with a slit 59 for introducing the saw blade edgewise in the machine with the assistance of a pair of incurvated inlet members 60, 61. A number of shafts 62 are rotatably mounted in fixed bearings and each shaft 62 has fixed thereon a pinion 63 positioned outside the frame of the machine and a roller 64 mounted inside this frame. All pinions 64 are in meshing engagement with one another in the manner shown and rotatably driven by an electro-motor (not shown) so as to feed the saw blade through the various devices of the machine in the direction of the arrow. In front of each fixed roller 64 are positioned a plurality of sliding rollers 65. Each sliding roller 65 is mounted endwise of, and with its axis at right angles to a slide shaft 66 which is constantly urged away from the cooperating roller 64 by a spring 67. The end of each slide shaft 66 which is opposite to roller 65 is subjected to the pressure exerted by a hydraulic ram 68 supplied with a suitable fluid under pressure, e. g. oil, through a valve operated by an electromagnet (not shown) controlled in turn by one of the three detectors A, B and C. The pressure of the oil or other fluid delivered to the rams can be adjusted by means of a pressure regulator (not shown) of any suitable design. In the embodiment illustrated in the drawings each of the ten lower fixed rollers 64 provided registers with a set of three sliding rollers 65. Each of the ten upper fixed rollers 64 registers with a pair of sliding rollers. The fixed roller disposed at the top of the rolling unit is positioned in front of a set of three sliding rollers. Finally, a carriage 101 provided with another pair of rollers is superposed to the rolling unit and controlled by a handwheel 102 for positioning it in the transverse direction.

The electromagnet valves which operate the thirty sliding rollers positioned in front of the group of ten lower fixed rollers are controlled separately by an electronic relay energized by the planishing-presetting detector A so that the blade will be rolled locally in those places where swells will have been detected by the levers 29, whereby the saw blade planishing step will be effected by the machine. The electromagnet valves which operate the twenty sliding rollers positioned in front of the group of ten upper fixed rollers are controlled separately by an electronic relay operated by the stretching-presetting detector B so as to roll the blade locally in those places where swells will have been detected by the other set of levers 49, whereby the saw blade stretching step will be performed by the machine.

Regarding the last step of the operation of the machine, that is the straightening of the saw blade, it is performed on the toothed edge of the blade by that sliding roller of the three mounted at the top of the rolling unit which is positioned in front (see Fig. 1) and, on the back edge of the blade, by the pair of rollers carried by the carriage 101, the transverse position of these last-mentioned rollers being adjustable according to the blade width by operating the handwheel 102. These two sliding rollers are controlled separately by an electronic relay actuated in turn by the straightening-presetting detector C so as to roll the back edge of the blade in those places where concavities are detected by the cooperating photoelectric cell, and the toothed edge of the blade in those places where convexities are detected by the other cooperating photoelectric cell.

The three operative steps performed by the machine, that is planishing, stretching and straightening of the saw blade, are therefore effected in a single operation. However, should the saw blade width exceed the transverse maximum width of the assembly comprising the detecting levers A and B and the pressing rollers, the operation may be carried out in two phases so that each phase will serve to recondition one longitudinal strip of the saw blade.

The electronic relays inserted between the detecting circuit of each longitudinal saw blade strip—which circuit is opened as explained above by each lever of either group A or group B—or each of the two circuits controlled by the two photoelectric cells of detector C, respectively, and the electromagnet valve controlling the planishing, stretching or straightening sliding roller in front of which this longitudinal saw blade strip is fed, are arranged in view of introducing a time lag in the actuation of this electromagnet valve which is equal to the time required for travelling the blade between the detector lever and the cooperating pressing rollers. As illustrated in the wiring diagram of Fig. 9 the circuit 69 of each detecting lever and each photoelectric cell comprises the winding of an electromagnet 70 arranged to operate a switch 71 inserted in a circuit having its terminals connected to the positive and negative conductors 72, 73 of a main supply and to a high-voltage wire 74 and comprising the winding 75 of the electromagnet valve provided for releasing the hydraulic ram controlling in turn the pressing rollers corresponding to the detecting lever. Winding 75 is energized through a thyratron tube 76 when the biasing voltage attains the ionisation value of the thyratron tube. The time-lag device consists of a series of capacitors 77 to 80 which may be inserted in the circuit at will through a switch 81 and a rheostat 82. By operating the switch 81 and adjusting the rheostat 82 it is thus possible to regulate the time constant of the circuit to such a value that the time lag brought in the transmission of energizing current from winding 69 to winding 75 will be equal to the time required by the saw blade for travelling from the detector lever to the corresponding pressing roller. Preferably, the thyratron tube 76 will be of the tetrode type and its second grid will permit the application of either a negative U-voltage for de-ionising purpose or of a positive U-voltage for energizing the thyratron with a negative biasing voltage fed to the first grid thereof through the capacitor and rheostat circuit.

Figs. 10 to 13 illustrate a modified embodiment of the machine operating in the same fashion as the arrangement described hereinabove but constructed in a considerably simplified manner and, therefore, at a lower cost.

In this modified embodiment the detections concerning the planishing step to be carried out on the blade are effected by a pair of feelers engaging either faces of the blade respectively. The detection in view of stretching the blade portions requiring this step is ensured by a single feeler whilst the rolling operations corresponding to these detections are carried out by a set of three rollers controlled by the aforesaid three feelers respectively, these feelers and rollers being shifted stepwise automatically in the transverse direction of the blade at each complete revolution thereof in order to effect the detecting and rolling operations throughout the width of the saw blade.

As illustrated in Fig. 10 and in accordance with the above description of the first embodiment, each pair of pressing rollers comprises a roller 64' rotatably driven by a shaft 62' carrying a pinion 63' and a roller 65' adapted to be pressed against the roller 64' by a rod 66' controlled in turn by a hydraulic device. However, only three pairs of rollers are provided in this arrangement, the rollers of each pair being positioned in the same plane in superposed relationship. Besides, instead of mounting these pairs of rollers directly on a frame 1', they are mounted on a sliding block 83 engaging slideways 84 machined or fitted on the frame. The shafts 62' are rotatably fast with, but axially independent from the pinions 63' mounted in the shaft through splines or other coupling means. A lever 85 fulcrumed on a pin 86 fixed to the frame is adapted to be rocked about this pin against the resiliency of a spring 87 by a hydraulic ram 88 controlled through an electromagnet valve 89. At the end of lever 85 which is opposite to pin 86 a pawl 90 is fulcrumed and urged by a spring 91 surrounding a rod 92 so that the pawl 90 is urged towards engagement with the teeth of a serrated rack 93 carried by one side of block 83. On the same disc of block 83 is pivotally fixed the outer end of the rod of a hydraulic piston 94 controlled by an electromagnet valve 95 adapted at the same time to lift the spring rod 92. On the other hand, the saw blade is provided with a catch (not shown) for actuating the electromagnet valve 89, the other electromagnet valve 95 being controlled by another catch (not shown) mounted on the frame 1'.

The three rollers 65' are urged against the cooperating rollers 64' upon actuation of the corresponding feeler, as in the former embodiment; thus, the side-shifting of these rollers normally to the saw blade edge is obtained automatically in the following manner:

At each complete revolution of the saw blade the catch carried thereby closes the energizing circuit of the electromagnet valve 89 and the piston rod of the hydraulic ram 88 is pushed outwards, thus causing the lever 85 to rotate in the anti-clockwise direction and, through the rack-engaging pawl 90, to move the block 83 to the right together with the three pairs of rollers carried thereby through a distance equal to one pitch or tooth of rack 93. When the block 83 has been displaced in this stepwise fashion to its farthermost position at the right of Fig. 10, that is the position in which the rollers engage the extreme right-hand edge of the saw blade, the catch carried by the frame 1' closes the circuit controlling the energizing of electromagnet 95 and as a result rod 92 is lifted and disengages pawl 90 from rack 93 while controlling the outward movement of the piston rod of the hydraulic ram 94 so as to bring the block 83 to its initial position at the left of Fig. 10 wherein the rollers engage the left-hand edge of the saw blade.

The feeler provided for detecting tension irregularities in the saw blade is moved automatically in a direction transversely thereto, in synchronism with the movement of the three pairs of pressing rollers, more particularly the pair of rollers provided for carrying out the tension rolling step under the control of this feeler. The mechanism performing this automatic displacement is illustrated in Figs. 11 to 13. The detector frame 41' carries a support 43' through the same mechanism as the corresponding frame and support 41 and 43 respectively of the first embodiment. However, the knife-edge 48' on which the feeler lever 49' rests, instead of being fixed directly on the support 43' is carried by a slide 96 mounted in slideways formed in this support 43'. This slide 96 has attached at either ends the end links of a chain 97 engaging a pair of sprockets 98, 99 journaled in the support 43'. The sprocket 98 is fast with a coaxial ratchet wheel 100 engaged by a pawl 101 pivotally mounted on a lever 102. This lever 102 in turn is fulcrumed by one end about a pin 103 fixed to the support 43' and operatively connected at the other end to the movable armature rod of an electromagnet 104. A hydraulic ram 105 is arranged in order to return the slide 96 to the left according to Fig. 12. This ram is actuated through an electromagnet 106 adapted also to control the release of the pawl 101 from the ratchet wheel 100 through the medium of a cranked lever 107 and a rod 108. The catch carried by the saw blade is so positioned as to close at each revolution of the blade the circuit for energizing the electromagnet 104, another catch (not shown) being provided on the support 43' for actuating the electromagnet valve 106.

This automatic device for controlling the transverse feed of feeler 49' operates as follows:

At each revolution of the saw blade the catch carried thereby closes the energizing circuit of the electromagnet 104, thus pivoting the lever 102 about its fulcrum 103 and actuating the pawl 101 and therefore the sprocket wheel 98 through the ratchet wheel 100. As a result, the slide 96 attached to the chain driven by the sprocket wheel 98 is moved along a distance corresponding to one tooth of the ratchet wheel 100. When the slide 96 has been moved in this step-by-step fashion to the right-hand end of its stroke according to Fig. 12 the feeler lever 49' will have reached the right-hand edge of the saw blade and the catch carried by the support 43' closes the circuit of the electromagnet valve 106 so as to successively effect the release of pawl 101 from ratchet wheel 100 for permitting the return stroke of slide 96, the actuation of the hydraulic ram 105 for restoring this slide 96 to its initial position at the left-hand side of Fig. 12 corresponding to the travel of the feeler lever 49' from the right to the left-hand edge of the saw blade.

Both feelers provided for detecting any irregularities in the previously planished blade are displaced automatically across the blade width by a device identical with that described above that controls the feeler for detecting irregularities in the internal tension of the saw blade.

Of course, many modifications and alterations may be brought to the practical embodiments described hereinabove and illustrated in the accompanying drawings, without departing however from the spirit and scope of the invention. More particularly, the number and arrangement of the detecting or feeler levers and pressing rollers is simply a matter of design and should be adapted to the types of endless saw blades to be treated in the machine. Instead of disposing the members of the detecting device B on the convex face of the curved portion of the blade, these members may be arranged to scan the concave blade face, the swells detected on this concave face corresponding to the cavities of the convex face.

The planishing-presetting detector C may be provided with mechanical feeler levers instead of photoelectric cells. Besides, the machine may be constructed horizontally instead of vertically, or in any other desired position. The electronic transmission may be carried out through any other suitable electric combination with the same results.

What I claim is:

1. Automatic planishing, stretching and straightening machine for band saw blades, comprising means for continuously moving the saw blade to be treated in its longitudinal direction along a path having a rectilinear and a curvilinear portion, a first and a second series of feelers arranged on either sides of said rectilinear blade portion, a third series of feelers arranged on the convex side of said curvilinear blade portion, a first and a second optical detectors, a light source associated with each of said optical detectors, an optical system for focusing the light beam from said light source in a direction substantially at right angles to the plane of said blade in said rectilinear portion and in the radial direction in said curvilinear portion, so that said light beam will be focused to a point of the respectively flat and curved plane of said blade which is situated in the vicinity of the back edge of said blade, said point being positioned inside said back edge in the case of said first optical detector and outside said back edge in the case of said second optical detector, a pressing roller arranged on one side of said blade and adapted to cooperate with each of said feelers and optical detectors, each of those rollers which are adapted to cooperate with a feeler being mounted in front of the longitudinal blade line registering with the corresponding feeler whilst each of those rollers which are adapted to cooperate with said optical detectors are mounted the one in the vicinity of said back edge and the other in the vicinity of the toothed edge of said blade, a slide carrying said pressing roller, a ram adapted to be operated by a liquid under pressure and to move said slide in order to press said roller against said saw blade, a fixed roller registering with said pressing roller and mounted on the other side of said saw blade for supporting said saw blade when it is pressed by said pressing roller, means for feeding said liquid under pressure into each ram for actuating a roller adapted to cooperate with a feeler when said feeler, with an anticipation equal to the time required for moving said saw blade from said feeler to said pressing roller, has engaged, in the case of said two first series of feelers, and has not engaged, in the case of said third series of feelers, a swell on said blade, and means for feeding said liquid under pressure into each of said hydraulic rams controlling pressing rollers adapted to cooperate with said optical detectors when the light beam from the light source of the corresponding optical detector, with an anticipation equal to the time required for moving said saw blade from said optical detector to said pressing roller, passes across the plane of said saw blade without being intercepted by said saw blade in the case of said first detector, and does not pass across said plane on account of its interception by said saw blade in the case of said second detector.

2. Automatic planishing, stretching and straightening machine for band saw blades, comprising means for continuously moving the saw blade to be treated in its longitudinal direction along a path having a rectilinear portion and a curvilinear portion, a first and a second series of feelers arranged on either sides of said blade in front of said rectilinear portion, a third series of feelers disposed on the convex side of said blade and registering with said curvilinear portion, a first and a second optical detector, a light source associated with each of said optical detectors, an optical system for focusing the light beam from each light source in a direction substantially perpendicular to the plane of said blade and on a point of said plane situated in the vicinity of the back edge of said blade, inside the plane occupied by said blade when said blade is straight for said first optical detector and outside said plane for said second optical detector, a photoelectric cell disposed in alignment with the light source of each optical detector on the other side of said light source with respect to said plane of said blade so as to cause said light beam to strike said photoelectric cell when said light beam is not intercepted by said blade, an electrical circuit for each feeler and each optical detector, the arrangement of this electrical circuit being such that current is caused to flow through said circuit when each feeler detects a swell in said blade, as far as the feelers of said first and second series of feelers are concerned, and when each feeler does not detect any swell in said blade, as far as said third series of feelers are concerned, so that when the photoelectric cell of said first optical detector is energized a concavity will be signalled in the vicinity of the back edge of said blade, and when the photoelectric cell of said second optical detector is not energized a convexity will be signalled in the vicinity of said back edge, a pressing roller mounted on one side of said blade and operatively connected with each of said feelers and optical detectors, each roller associated with a feeler being disposed in front of the longitudinal line of said blade which travels in front of the cooperating feeler and each roller associated with said optical detectors being disposed the one in the vicinity of said back edge and the other in the vicinity of the toothed edge of said blade, a slide carrying a pressing roller, a ram adapted to be operated by a liquid under pressure, to move said slide and apply said pressing roller against said blade when said blade is clamped by said pressing roller, an electromagnet valve energized when current flows through said electrical circuit of each feeler and associated optical detector, and means for retarding the action exerted by said current on said electromagnet valve by a time equal to that required for travelling said blade between each feeler and its associated pressing roller in the case of said feelers and between said optical system and its associated pressing roller in the case of said optical detectors.

3. Automatically planishing, stretching and straightening machine for band saw blades according to claim 2, comprising a frame made of two main portions of which the first portion is fixed and the other portion slidably mounted on said first portion in order to adapt the machine to different saw blade lengths and comprising a series of loose pulleys, part of said pulleys being mounted on said fixed portion and part on said sliding portion for guiding said band saw blade during its travel in the machine.

4. Automatic planishing, stretching and straightening machine for band saw blades according to claim 3 comprising pairs of rollers mounted on said fixed frame portion for guiding said band saw blade through both edges thereof at the entrance and exit of said rectilinear portion in which said saw blade is caused to travel in front of said first and second series of feelers, said pairs of rollers being adjustable in the clamping direction for permitting the edgewise introduction and subsequent clamping of said saw blade on the one hand and in the transverse direction for adapting the machine to different saw widths on the other hand.

5. Automatic planishing, stretching and straightening machine for band saw blades according to claim 4 comprising a pair of coaxial rotary circular discs mounted on said fixed frame portion for guiding said saw blade along said curvilinear portion by causing both side edges of said saw blade to engage said discs, and detachable guide members mounted on said fixed frame portion at the periphery of one of said circular discs for preventing said saw blade from escaping sidewise from said one disc, said other disc being formed with a peripheral shoulder portion for preventing said saw blade from escaping sidewise from said other disc.

6. Automatic planishing, stretching and straightening machine for band saw blades according to claim 5 comprising pinions carried by said fixed frame portion and rotatably fast with said fixed roller and in meshing engagement with one another, and an electro-motor adapted to continuously uniformly rotating said fixed pinions and rollers for impressing a continuous and uniform longitudinal motion about itself to said saw blade clamped between said fixed and pressing rollers.

7. Automatic planishing, stretching and straightening machine for band saw blades according to claim 2 wherein said means for retarding the action exerted by said current flowing through the circuit of each feeler and each optical detector on the electromagnet controlling each pressing roller comprise an electromagnet connected in said circuit, another circuit of which the current actuates said electromagnet valve, a switch arranged in said other circuit for closing and opening said other circuit when said electromagnet in said first circuit is energized, said other circuit comprising in addition a thyratron tube, a rheostat, a set of capacitors and another switch whereby any desired one of said capacitors can be inserted in said other circuit at will.

8. Automatic planishing, stretching and straightening machine for band saw blades according to claim 6 wherein each of said three series of feelers consists of only one feeler, said three feelers being disposed, together with the corresponding three pressing rollers and three associated fixed rollers, in front of a same longitudinal line of said saw blade, and means for automatically shifting said feelers and rollers across the width of said saw blade at each complete revolution of said saw blade for treating a new longitudinal line of said saw blade, and means for returning said feelers and rollers back to their initial positions across the width of said saw blade after said blade has been treated throughout its width.

9. Automatic planishing, stretching and straightening machine for band saw blades according to claim 8 comprising slideways on said fixed frame portion, a block mounted for sliding movement on said slideways in a direction across said saw blade and carrying said rollers, a serrated rack carried by said block and parallel with said slideways, a pawl having its nose engaged in the teeth of said rack, a lever fulcrumed on said fixed frame portion and having pivotally mounted said pawl on it, an electromagnet valve mounted on said fixed frame portion for actuating said lever and moving said pawl and said block, an electrical control circuit for said electromagnet valve, and a catch carried by said saw blade and adapted at each complete revolution of said saw blade to close said electromagnet-valve control circuit for moving said block and said rollers carried thereby across said saw blade by a width corresponding to one tooth of said rack.

10. Automatic planishing, stretching and straightening machine for band saw blades according to claim 9 comprising a hydraulic ram mounted on said fixed frame portion for returning said block to its initial position, another electromagnet valve mounted on said fixed frame portion for releasing said pawl from said rack and actuating said hydraulic ram, an electrical control circuit for said other electromagnet valve and a catch carried by said fixed frame portion for closing said control circuit and actuating said other electromagnet valve when said block has completed its stroke on said fixed frame portion.

11. Automatic planishing, stretching and straightening machine for band saw blades according to claim 9 comprising a slide registering with said curvilinear blade portion, carrying said third feeler and mounted on slideways for permitting the movements of said third feeler across the width of said saw blade, an endless chain carrying said slide for moving said slide along said slideways, a pair of chain sprockets for supporting and driving said endless chain, a ratchet wheel fast and coaxial with one of said sprocket wheels, a pawl having its nose portion engaging said ratchet wheel, a lever for actuating said pawl, an electromagnet for operating said lever and an electrical circuit for energizing said electromagnet at each complete revolution of said saw blade through said catch carried by said saw blade in order to move said slide and said feeler carried thereby across the width of said saw blade by a distance corresponding to one tooth of said ratchet wheel.

12. Automatic planishing, stretching and straightening machine for band saw blades according to claim 11 comprising a hydraulic ram for restoring said slide to its initial position, an electromagnet valve for releasing said pawl from said ratchet wheel and actuating said hydraulic ram, an electrical control circuit for said electromagnet valve and a fixed catch engaged by said slide when said slide has completed one full stroke for closing said electromagnet valve control circuit.

PIERRE SENARD.

REFERENCES CITED

The following references are of record in the file of this patent:

UNITED STATES PATENTS

| Number | Name | Date |
|---|---|---|
| 2,438,460 | Senard | Mar. 23, 1948 |
| 2,441,648 | Senard | May 18, 1948 |